United States Patent
Chiba et al.

(10) Patent No.: US 7,058,230 B2
(45) Date of Patent: Jun. 6, 2006

(54) METHOD AND APPARATUS FOR ENCODING IMAGE DATA, AND COMPUTER-READABLE RECORDING MEDIUM IN WHICH PROGRAM FOR ENCODING IMAGE DATA IS RECORDED

(75) Inventors: Hirotaka Chiba, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 734 days.

(21) Appl. No.: 10/338,839

(22) Filed: Jan. 9, 2003

(65) Prior Publication Data
US 2003/0194145 A1 Oct. 16, 2003

(30) Foreign Application Priority Data
Apr. 10, 2002 (JP) ............................. 2002-107661

(51) Int. Cl.
G06K 9/36 (2006.01)
G06K 9/46 (2006.01)

(52) U.S. Cl. .................. 382/243; 382/251; 382/250; 382/239; 382/248; 375/240.03; 375/240.12; 375/240.16; 375/240.18

(58) Field of Classification Search ................ 382/166, 382/232, 233, 239, 240, 243, 248, 251, 274, 382/250; 375/240.03, 240.12, 240.16, 240.18, 375/240.22
See application file for complete search history.

(56) References Cited

U.S. PATENT DOCUMENTS

| | | | | |
|---|---|---|---|---|
| 5,422,736 | A | * | 6/1995 | Katayama .................... 358/462 |
| 5,666,161 | A | * | 9/1997 | Kohiyama et al. ...... 375/240.18 |
| 6,728,317 | B1 | * | 4/2004 | Demos .................. 375/240.21 |
| 2002/0044693 | A1 | * | 4/2002 | Ogawa ........................ 382/236 |

FOREIGN PATENT DOCUMENTS
JP HEI 4-291882 10/1992

* cited by examiner

Primary Examiner—Jingge Wu
Assistant Examiner—Ali Bayat
(74) Attorney, Agent, or Firm—Staas & Halsey LLP

(57) ABSTRACT

An accurate encoding of image data representing a source image, which data is divided into a multiplicity of blocks is performed in accordance with features of the source image by defining a plurality of sub-areas each of which including one or more blocks; quantizing the multiple blocks; counting the number of valid coefficients among the quantization coefficients in each sub-area; adjusting the quantization coefficients of the plural sub-area in accordance with a distribution of the number of valid coefficients over the plural sub-areas (that is, a degree of appearance of the valid coefficients of each sub-area); and encoding the adjusted quantization coefficients. In addition to the accuracy, encoding of image data using sub-areas enhances a speed of processes.

24 Claims, 14 Drawing Sheets

FIG. 2

| SUB-AREA | THE NUMBER OF COUNTED VALID COEFFICIENTS |
|---|---|
| SUB-AREA 1 | N1 |
| SUB-AREA 2 | N2 |
| ⋮ | ⋮ |
| SUB-AREA k | Nk |

IMAGE OF PERSON

IMAGE OF LANDSCAPE

FIG. 11
RELATED ART

| 10 | 15 | 13 | 14 | 14 | 14 | 14 | 14 |
|----|----|----|----|----|----|----|----|
| 13 | 16 | 19 | 18 | 20 | 24 | 22 | 22 |
| 13 | 15 | 16 | 20 | 18 | 21 | 22 | 22 |
| 14 | 14 | 17 | 21 | 21 | 22 | 23 | 19 |
| 14 | 16 | 17 | 21 | 21 | 22 | 24 | 23 |
| 14 | 15 | 22 | 22 | 22 | 25 | 26 | 24 |
| 15 | 17 | 25 | 29 | 29 | 46 | 33 | 35 |
| 27 | 34 | 39 | 43 | 50 | 62 | 45 | 54 |

FIG. 12
RELATED ART

| 91  | −17 | −6 | 1  | −2 | 0  | 3  | −2 |
|-----|-----|----|----|----|----|----|----|
| −28 | 8   | 3  | −2 | 1  | 1  | −4 | 2  |
| 14  | −3  | −1 | 1  | −1 | −3 | 3  | −1 |
| −14 | 4   | 1  | −1 | 0  | 1  | −1 | 2  |
| 9   | 1   | 0  | 1  | 2  | −3 | −2 | 0  |
| −6  | 0   | −1 | 1  | 0  | 1  | 0  | 0  |
| 0   | 2   | 1  | −1 | 1  | 0  | −1 | 0  |
| −1  | 0   | 0  | 0  | 0  | 0  | 0  | −1 |

FIG. 13
RELATED ART

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 13 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 14
RELATED ART

| 5  | −2 | 0 | 0 | 0 | 0 | 0 | 0 |
|----|----|---|---|---|---|---|---|
| −3 | 1  | 0 | 0 | 0 | 0 | 0 | 0 |
| 1  | 0  | 0 | 0 | 0 | 0 | 0 | 0 |
| −1 | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |

FIG. 15
RELATED ART

| 1  | 2  | 6  | 7  | 15 | 16 | 28 | 29 |
|----|----|----|----|----|----|----|----|
| 3  | 5  | 8  | 14 | 17 | 27 | 30 | 43 |
| 4  | 9  | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

METHOD AND APPARATUS FOR ENCODING IMAGE DATA, AND COMPUTER-READABLE RECORDING MEDIUM IN WHICH PROGRAM FOR ENCODING IMAGE DATA IS RECORDED

BACKGROUND OF THE INVENTION

1. Field of the Invention

The present invention relates to technology for encoding multi-level image data divided into a multiplicity of blocks each of which includes a number of pixels (for example 8·8 pixels; 8·8 read "8-by-8"), which encoding follows an orthogonal transformation that is performed on tone values of the pixels in each of the multiple blocks.

2. Description of the Related Art

Generally, tone values of each pixel in image data, especially halftone or color image data that has a far larger data volume than numeric data, should be effectively encoded in order to be retained and sent at high quality and at high speed.

An encoding method of the JPEG (Joint Photographic Expert Group) is known as a method for effectively encoding image data. The JPEG method comprises the following steps of: dividing image data representing a source image into a multiplicity of blocks each of which includes 8·8 pixels; performing a two-dimensional discrete cosine transform (hereinafter called a DCT transformation) on signals of each of the multiple blocks to transform the signals into DCT coefficients distributed over the spatial frequencies; quantizing the DCT coefficients using threshold values adapted to human visual perception to obtain quantized DCT coefficients; and encoding the quantized DCT coefficients using one or more statistically-obtained Huffman tables.

An accompanying drawing FIG. 10 is a block diagram schematically showing a conventional JPEG encoding circuit, as shown in accompanying drawing FIG. 10, which comprises inputting terminal 31, two-dimensional DCT converter 32, linear quantizing section 33, quantization matrix 34, variable-length encoding section 35, coding table (Huffman tables) 36, and outputting terminal 37.

Image data of an encoding target is divided into a multiplicity of blocks each of which includes 8·8 pixels (an example of a block is shown in accompanying drawing FIG. 11) and then the image data in the form of tone values is inputted to two-dimensional DCT converter 32 via inputting terminal 31. Upon receipt of the tone values, two-dimensional DCT converter 32 performs a DCT transformation of an orthogonal transformation on the tone values of each block shown in FIG. 11 so that the tone values are converted into DCT coefficients distributed over the spatial frequencies as shown in accompanying drawing FIG. 12. After that, two-dimensional DCT converter 32 outputs the DCT coefficients to linear quantizing section 33.

Linear quantizing section 33 multiplies each of 8·8 elements of quantization matrix 34 predefined based on the result of visual experiments by a quantization adjusting parameter to thereby obtain a quantization threshold value corresponding to each element and performs linear quantization by dividing the DCT coefficients from two-dimensional DCT converter 32 by the obtained quantization threshold values to obtain quantized DCT coefficients. Quantization matrix 34 is as shown in accompanying drawing FIG. 13 formed by 8·8 threshold values, for example. DCT coefficients of FIG. 12 are linear quantized using quantization matrix 34 so that linear quantizing section 33 creates quantized DCT coefficients shown in accompanying drawing FIG. 14. Linear quantization makes quantization DCT coefficients generated from DCT coefficients smaller than the corresponding threshold value become zero as shown in FIG. 14. Therefore, non-zero quantized DCT coefficients of each block are DC coefficients (a value indicates the total level, "five" in FIG. 14) and a small number of AC coefficients (five AC coefficients in FIG. 14).

The quantized DCT coefficients arranged in two dimensions are converted into one-dimensional serial data by zig-zag ordering scanning as shown in accompanying drawing FIG. 15, and the serial data is inputted to variable-length encoding section 35. Variable-length encoding section 35 performs a variable-length coding on the difference between the DC coefficients that is the first piece of serial data of each block and the DC coefficients of the block immediately before. Further, variable-length encoding section 35 performs variable-length encoding on values of valid AC coefficients that are not zero (hereinafter the values are called "indexes") and on the length of run between an index and invalid coefficients whose values are zero (hereinafter a length is simply called a "run"). Variable-length encoding section 35 encodes each of the DC and AC coefficients using coding table 36 in the form of one or more Huffman tables created in accordance with the statistical data volume of each image. The thus obtained encoded data is sequentially output from outputting terminal 37.

In a JPEG technique, image data sometimes has to be encoded to a desired data volume, in other words, the volume of encoded image data has to be the desired data volume. This occurs when the encoded image data representing a predetermined number of source images is to be stored in a recording medium of limited volume, such as an IC memory or a flexible disc.

Conventionally, the following manner of controlling encoding has been proposed so that image data is encoded to a desired data volume. As described above, quantization and subsequent variable-length encoding are performed on DCT coefficients to thereby obtain a volume of encoded data. If the encoded data volume is different from a desired data volume, coarseness of quantization (i.e., quantization threshold values) is changed and quantization and variable-length encoding are performed again. In the same manner, changing threshold values, quantization, variable-length encoding repeat until the image data is encoded to the desired data volume.

In the above-mentioned manner, the relationship between a volume of encoded image data and coarseness of quantization is obtained by performing variable-length encoding at least once so that the same image data is encoded to a desired data volume. The obtained relationship is used to determine coarseness of quantization, which is used to encode the image data to the desired data volume. This means that control between quantization and variable-length encoding is performed in a feed-back manner, which results in complicated processes. Further, since variable-length encoding takes a long time, it is time-consuming to determine an appropriate coarseness of quantization, i.e., to obtain an encoded image data of a desired data volume. Especially in the above case, variable-length encoding may be repeated several times whereupon an extremely long time is required to complete the processes.

As a solution, Japanese Patent Registration No. 2820807 discloses the following method of encoding image data. For example, a JPEG encoding circuit to which the encoding method is applied includes, as shown in accompanying drawing FIG. 16, two-dimensional DCT converter 1, DCT coefficient retaining section 2, linear quantizing section 3, quantized DCT coefficient retaining section 4, coding table 5, variable-length encoding section 6, valid coefficient counter 7, and data volume adjusting section 8.

Two-dimensional DCT converter 1 receives image data PCS divided into the multiple blocks each of which has 8·8 pixels and then performs an orthogonal transformation on each block of the image data PCS by a DCT transformation, in the same manner performed in two-dimensional DCT converter 32 of FIG. 10, to thereby obtain 8·8 DCT coefficients distributed over spatial frequencies. DCT coefficient retaining section 2 temporarily retains the 8·8 DCT coefficients of each block obtained in two-dimensional DCT converter 1.

Linear quantizing section 3 receives the 8·8 DCT coefficients of each block from DCT coefficient retaining section 2 and performs linear quantization on the 8·8 DCT coefficients, likewise the linear quantizing section 33 of FIG. 10, to output quantized DCT coefficients. Linear quantizing section 3 includes divider 3a, which divides 8·8 DCT coefficients per block by quantization threshold values q(i) (each q(i) is an integer equal to or greater than "0", i=0, 1, . . . , 63), each of which corresponds to one of the 8·8 DCT coefficients to thereby quantize the 8·8 DCT coefficients.

Quantized DCT coefficient retaining section 4 temporarily retains 8·8 quantized DCT coefficients of each block obtained by linear quantizing section 3. Coding table 5 takes the form of one or more Huffman tables in the same way as coding table 36 of FIG. 10.

Variable-length encoding section 6 receives one-dimensional serial data, which is the result of conversion by zig-zag ordering scanning performed on the two-dimensional 8·8 quantized DCT coefficients of each block, from quantized DCT coefficient retaining section 4 and encodes the quantized DCT coefficients using coding table 5 in the same in which the coefficients are received, in the same manner as variable-length encoding section 35 of FIG. 10.

Valid coefficient counter 7 counts the total number n of valid coefficients (non-zero quantized DCT coefficients) among the quantized DCT coefficients of the entire image data by adding the 8·8 quantized DCT coefficients of each block.

Data volume adjusting section 8 determines quantization threshold values q(i) in accordance with the total number n of valid coefficients, and adjusts a data volume of the quantization coefficients in such a manner that the valid coefficients of the entire image data is to be encoded to a desired data volume F. Data volume adjusting section 8 includes data-volume/valid-coefficient changing section 81 and quantization threshold value determining section 82.

Data-volume/valid-coefficient changing section 81 converts the desired data value F into the total number m of valid coefficients to be allocated to the entire image data representing a source image. Since a data volume of encoded quantization coefficients (bit per pixel) is proportional to the average number of valid coefficients per block consisting of 8·8 pixels as shown in accompanying drawing FIG. 17, data-volume/valid-coefficient changing section 81 computes the total number m of valid coefficients to be allocated to the entire image data which number conforms to the desired data volume F based on the proportionate relationship.

Quantization threshold value determining section 82 determines quantization threshold values q(i) based on the difference between the total number n obtained by valid coefficient counter 7 and the total number m obtained by data-volume/valid-coefficient changing section 81. Quantization threshold value determining section 82 comprises quantization threshold value retaining section 82a, scaling controller 82b and multiplier 82c.

Quantization threshold value retaining section 82a retains 8·8 quantization threshold values Q(i) (each Q(i) is an integer equal to or greater than "0", i=0, 1, . . . , 63), which are predefined.

Scaling controller 82b determines, in accordance with the difference between the total number n obtained by valid coefficient counter 7 and the total number m obtained by data-volume/valid-coefficient changing section 81, a scaling factor SF used for scaling the predefined quantization threshold values Q(i).

Multiplier 82c scales the predefined quantization threshold values Q(i) by multiplying a scaling factor SF determined by scaling controller 82b and the predefined quantization threshold values Q(i) retained in quantization threshold value retaining section 82a. The scaled quantization threshold values Q(i) are regarded as actual quantization threshold values q(i) and are input to divider 3a in linear quantizing section 3.

Quantization threshold values q(i) become greater (in other words, quantization becomes coarser) in accordance with an increase in a scaling factor SF whereupon the total number n of valid coefficients is reduced. On the other hand, quantization threshold values q(i) become smaller (i.e., quantization becomes less grainy) in accordance with a decrease in a scaling factor SF whereupon the total number n of valid coefficients increases. Namely, a scaling factor SF is inversely proportional to the total number of valid coefficients as shown in accompanying drawing FIG. 18. Therefore, if the difference between the total numbers n and m is outside a predefined allowable range and at the same time n is larger than m (i.e., n>m), scaling controller 82b sets a scaling factor SF to be large. Conversely, if the difference between n and m is outside the allowable range and n is smaller than m (i.e., n<m), a scaling factor SF is set to be small.

An operation performed in the JPEG encoding circuit of FIG. 16 will now be described. The JPEG encoding circuit determines quantization threshold values q(i) by undertaking the following succession of procedural steps (1) through (13), which quantization threshold values q(i) cause a data volume of image data on which variable-length encoding is performed to be substantially identical to the desired data volume F. In this regard, a scaling factor SF is initialized to "1".

Step (1): Two-dimensional DCT converter 1 receives image data PCS divided in a multiplicity of blocks each of which consists of 8·8 pixels, performs an orthogonal transformation on each block by DCT transformation in order to obtain 8·8 DCT coefficients and stores the 8·8 DCT coefficients in DCT coefficient retaining section 2.

Step (2): data-volume/valid-coefficient changing section 81 computes the total number m of valid coefficients to be allocated to the entire image data based on a desired data volume F designated by a user or the like and the proportionate relationship of FIG. 17, and inputs the computed total number m to scaling controller 82b.

Step (3): DCT coefficient retaining section 2 sequentially outputs the retained DCT coefficients one by one to divider 3a of linear quantizing section 3 in accordance with individual data reading signals RDT issued from a non-illustrated timing controller.

Step (4): Concurrently with reading the individual DCT coefficient, multiplier 82c multiplies the predefined quantized threshold value Q(i) which is associated with the DCT coefficient and which is read from quantization threshold value retaining section 82a by the initial scaling factor SF of "1", which is output from scaling controller 82b. The result of the multiplication is regarded as quantization threshold value q(i) associated with the DCT coefficient and is input to divider 3a.

Step (5): Divider 3a divides the DCT coefficient received from DCT coefficient retaining section 2 by the associated quantization threshold value q(i). The resultant quantized DCT coefficient is output to quantized DCT coefficient retaining section 4 and valid coefficient counter 7.

Step (6): Valid coefficient counter 7 counts up non-zero coefficients (i.e., valid coefficients) among the quantized DCT coefficients received from divider 3a in order to count the number of valid coefficients of each block, and retains the counted number therein.

Step (7): Upon completion of quantization on a DCT coefficient, the timing controller instructs DCT coefficient retaining section 2 to read a next DCT coefficient. Steps (4) to (6) are performed on the next DCT coefficient.

Step (8): Steps (3) to (7) are performed on all blocks that constitute the entire image data so that valid coefficient counter 7 obtains the total number n of valid coefficients of the entire image data.

Step (9): The total number n obtained by valid coefficient counter 7 is input to scaling controller 82b.

Step (10): Scaling controller 82b determines, based on a difference between the total number m of valid coefficients associated with the desired data volume F and the total number n obtained by valid coefficient counter 7, whether or not the scaling factor SF is to be updated.

Step (11): Scaling controller 82b completes updating of the scaling factor SF if the difference between n and m is inside the predefined allowable range. While, if the difference is outside the allowable range and n is greater than m (i.e., n>m), scaling controller 82b increases the scaling factor by a certain amount; and if the difference is outside the allowable range and n is smaller than m (i.e., n<m), scaling controller 82b decreases the scaling factor SF by a certain amount.

Step (12): If a scaling factor SF is updated, the total number n retained in valid coefficient counter 7 is cleared to zero and procedural steps (3) to (11) repeat until a difference between the total numbers m and n falls within the allowable range.

Step (13): At the time the difference between n and m come to be within the allowable range, updating of the scaling factor SF is completed. DCT coefficients are quantized using quantization threshold values q(i) obtained on the basis of the resultant updated scaling factor, and thereby converted into quantized DCT coefficients, on which variable-length encoding section 6 performs variable-length encoding using coding table 5.

As described above, the JPEG encoding circuit of FIG. 16 counts the total number n of valid coefficients among quantized DCT coefficients obtained by quantizing on the entire image data, and determines quantization threshold values q(i) based on the total number n thus counted and the estimated total number m corresponding to the desired data volume F. Therefore, it is possible to determine quantization threshold values q(i) which cause the image data to be encoded to the desired data volume F without actually performing variable encoding.

However, since the JPEG encoding circuit of FIG. 16 determines quantization threshold vales q(i) based on the total number n of valid coefficients of the entire image data that is a target of encoding, the entire image is assumed to have constant features whereupon encoding is not performed in accordance with changes in tone or the like over the entire image data. Namely, a conventional encoding technique determines features of the entire image based on the total number n of valid coefficients appearing over the entire image data. For this reason, a landscape image whose center portion gradually varies in tone tends to be encoded coarsely because of features of the remaining portion so that an encoded image data volume cannot be accurately adjusted.

In the method for encoding image data performed by the JPEG encoding circuit of FIG. 16, variable-length encoding section 6 performs variable-length encoding once, but quantization performed by linear quantizing section 3 repeats until a difference between n and m comes to be within the allowable range. Completion of encoding in the JPEG encoding circuit of FIG. 16 requires in excess of 1.5 times longer time than that required for both quantization by linear quantizing section 3 and encoding by variable-length encoding section 6 once. Therefore, demands for alternative methods and circuits that reduce the time required have arisen.

SUMMARY OF THE INVENTION

With the foregoing problems in view, it is a first object of the present invention to provide a method and an apparatus for accurately encoding image data representing a source image in accordance with features of the source image, and to provide a computer-readable recording medium in which a program for accurately encoding image data representing a source image in accordance with features of the source image. It is a second object to provide a method and an apparatus for encoding image data representing a source image in accordance with features of the source image at a high speed and to provide a computer-readable recording medium in which there is a program for encoding image data representing a source image in accordance with features of the source image at a high speed.

To attain the first object, as a first generic feature, there is provided a method for encoding image data representing a source image, the image data having a multiplicity of blocks each of which includes a number of pixels (N·M pixels, where N and M are natural numbers, respectively), the method comprising the steps of: (a) defining a plurality of sub-areas so that each of the plural sub-areas has one or more of the multiple blocks; (b) performing an orthogonal transformation on tone values of the pixels in each of the multiple blocks to thereby obtain transform coefficients; (c) quantizing the transform coefficients of each block to thereby obtain quantization coefficients; (d) counting the number of valid coefficients among the quantization coefficients in each of the plural sub-areas; (e) adjusting the quantization coefficients of the multiple blocks in accordance with a distribution of the numbers of valid coefficients over the plural sub-areas (that is, in accordance with a degree of appearance of the valid coefficients of each sub-area), the numbers being counted in the step (d) of counting, in such a manner that the quantization coefficients are to be encoded to a desired data volume; and (f) encoding the adjusted quantization coefficients.

To accomplish the second object, as preferable features, the step (a) of defining may comprise: dividing the multiple blocks into uniform X·Y segments, where X and Y are natural numbers; and designating the entire part of each of the X·Y segments as one of the plural sub-areas, or may comprise dividing the multiple blocks into X·Y uniform first segments; designating one or more blocks in each of the X·Y first segments as a second segment so that the second segment is smaller than each first segment; and designating the second segment in each first segment as one of the plural sub-areas. As another preferable feature, the step (a) of defining may comprise: dividing the multiple blocks into X·Y uniform segments; and designating two or more from the X·Y segments as the plural sub-areas.

As still another preferable feature, the method may further comprise the steps of: counting a data volume of the quantization coefficients of each block during the step (f) of encoding; and if it is discriminated, on the basis of the data volumes counted in the step (g) of counting, the quantization coefficients representing the entire image data is likely to be encoded to a data volume exceeding the desired data volume, (h) changing one or more of the valid coefficients of the multiple blocks to invalid coefficients.

With the above generic and preferable features, the present invention guarantees the following advantages:

(1) The quantization coefficients are adjusted in accordance with the distribution of valid coefficients per sub-area (a degree of appearance of valid coefficients; the variance of valid coefficients over the plural sub-areas) so that the quantization coefficients are encoded to a desired data volume. It is possible for the adjusted quantization coefficients to reflect features of the source image of a target for encoding on the encoding processes whereupon the image data is accurately encoded in accordance with features of the source image.

(2) Each sub-area takes the form of a second segment having one or more blocks in the corresponding one of uniform X·Y first segments that are formed by dividing the image data, which second segment is smaller than the first segment, so that a data volume that is to be processed can be greatly reduced. Hence, it is possible to perform the encoding processes grasping features of the source image in a greatly reduced time.

(3) The plural sub-areas in the form of two or more of the uniform X·Y segments greatly reduce a data volume to be processed so that the time required to perform the encoding processes can be vastly reduced, while grasping features of the source image at the same time. Further, the number of sub-areas on which the encoding process is to be performed is also reduced, thereby reducing a capacity of a memory required to retain the result of counting the number of valid coefficients of each sub-area, which contributes to saving memory.

(4) It is possible to reduce a considerable data volume to be processed by designating two or more segments each of which includes one or more of the multiple blocks as the plural sub-areas on the basis of the type (e.g., a landscape image or a portrait image) of the source image so that a time required for the encoding processes can be remarkably reduced and at the same time features of the source image can be maintained. Further, the number of sub-areas on which the encoding process is to be performed is also reduced, thereby reducing memory capacity required to retain the result of counting, and thereby contributing to saving memory.

(5) If it is determined, based on the data volume counted during encoding of the adjusted quantization coefficients, that the quantization coefficients representing the entire image data is likely to be encoded to a data volume exceeding the desired data volume, one or more valid coefficients of the multiple blocks is changed to invalid coefficients. This degrades the quality of a peripheral portion of the source image to some extent, which portion is less focused on, but enhances the quality of the center portion which is largely focused on. Further, the resultant data volume of the encoded entire quantization coefficients can be reduced to the desired data volume and at the same time high-accuracy adjustment of the data volume can be performed at a high speed.

(6) A variance of the number of valid coefficients over the plural sub-areas are computed and quantization coefficients are adjusted in accordance with the computed variance so that a variation in valid coefficients over the source image grasps features of the source image whereupon the image data representing the source image can be subjected to an accurate encoding in accordance with the features.

Other objects and further features of the present invention will be apparent from the following detailed description when read in conjunction with the accompanying drawings.

BRIEF DESCRIPTION OF THE DRAWINGS

FIG. 2 is a table showing the number of valid coefficients in each sub-area;

FIG. 11 is a diagram showing an example of a block having 8·8 pixels in the image data that is a target for encoding;

FIG. 12 is a diagram showing the result of converting tone values of the block of FIG. 11 to DCT coefficients distributed over spatial frequencies;

FIG. 13 is a diagram showing an example of a quantized matrix including 8·8 threshold values;

FIG. 14 is a diagram showing the result (quantized DCT coefficients) of linear quantization performed on the DCT coefficients of FIG. 12 using the quantized matrix of FIG. 13;

FIG. 15 a is diagram showing an example of a sequence of scanning (zig-zag ordering scanning) of quantized DCT coefficients;

DESCRIPTION OF THE PREFERRED EMBODIMENTS

Various preferred embodiments and their modifications of the present invention will now be described with reference to the accompanying drawings.

(A) First Embodiment

Figure 1:
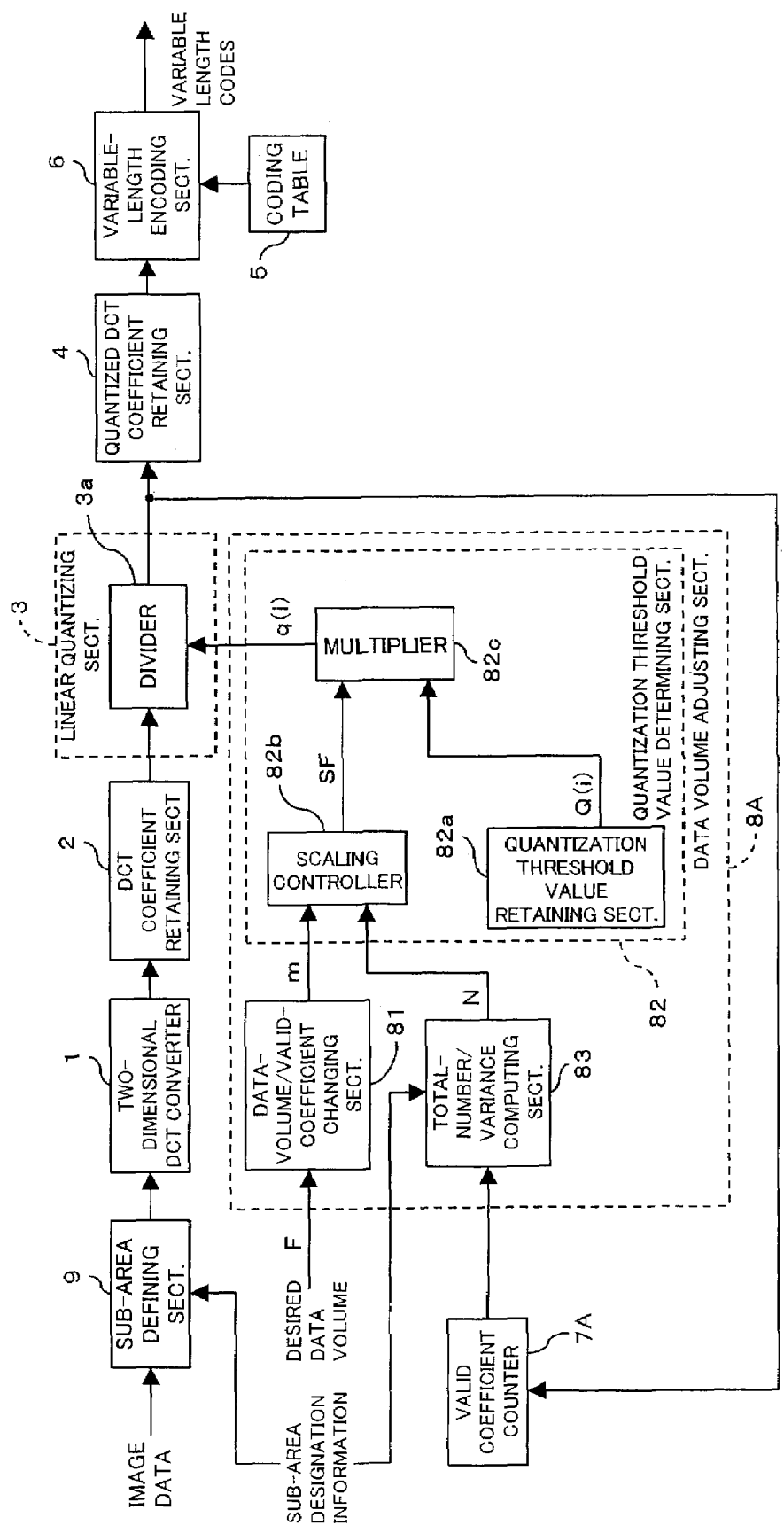
FIG. 1 is a block diagram schematically showing a JPEG encoding circuit to which a method for encoding image data according to a first embodiment of the present invention is applied.

FIG. 1 is a block diagram schematically showing a JPEG encoding circuit to which a method for encoding image data according to the first embodiment is applied. The JPEG encoding circuit of FIG. 1 divides image data representing a source image into a multiplicity of blocks each of which has 8·8 pixels (N=M=8). For each of the multiple blocks, an orthogonal transformation is performed on tone values of the 8·8 pixels in the block to obtain DCT coefficients (transform coefficients) and then the DCT coefficients are quantized to obtain quantized DCT coefficients (quantization coefficients), which are to be further encoded. The JPEG encoding circuit of the first embodiment comprises two-dimensional DCT converter 1, DCT coefficient retaining section 2, linear quantizing section 3, quantized DCT coefficient retaining section 4, coding table 5, variable-length encoding section 6, valid coefficient counter 7A, data volume adjusting section 8A and sub-area defining section 9.

Sub-area defining section (sub-area defining means) 9 defines a plurality of sub-areas (macro-blocks) each of which includes one or more of the multiple blocks of the image data representing the source image, which is a target of encoding, by selecting a number of blocks for one of the corresponding plural sub-areas. In the present embodiment, when counting of valid coefficients prior to encoding of quantized DCT coefficients, sub-area defining section 9 defines individual sub-areas to determine quantization requirements (i.e., quantization threshold values $q(i)$ (each $q(i)$ is an integer equal to or greater than "0", $i=0, 1, \ldots, 63$) which causes the image data to be encoded to a desired data volume F. As described later, valid coefficients are counted for each of the plural sub-areas that are defined by sub-area defining section 9.

Figure 3:
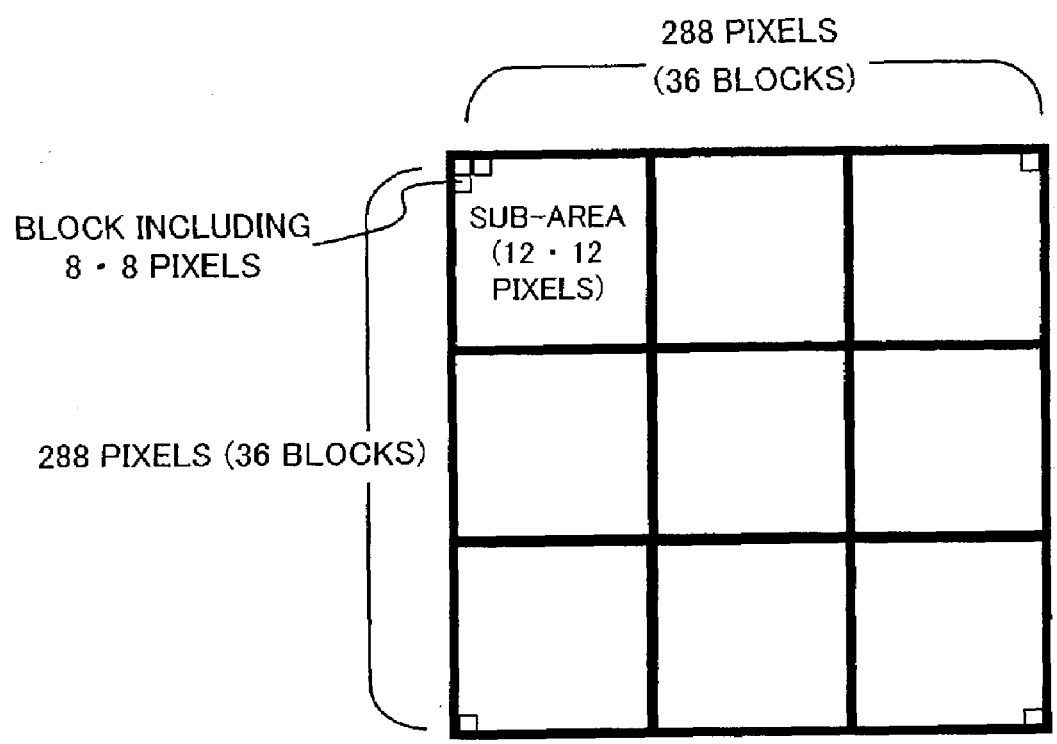
FIG. 3 is a diagram showing a relationship between blocks and sub-areas, and showing sub-areas in each of which the number of valid coefficients is counted.

Here, a relationship between blocks and sub-areas, and the sub-areas as targets for counting the number of valid coefficients will now be described with reference to FIG. 3. In the illustrated example as shown in FIG. 3, the image data of 288·288 pixels are divided into 36·36 blocks each of which has 8·8 pixels, and the 36·36 blocks are grouped into 3·3 sub-areas (X=Y=3; indicated by bold lines in the drawing) whereupon each sub-area is composed of 12·12 blocks. In other words, sub-area defining section 9 divides the entire blocks of the image data into 3·3 uniform segments and designates the entire part of each of the uniform segments as one of the sub-areas, as shown in FIG. 3. After that, the 3·3 sub-areas are selected one by one and valid coefficients in each selected sub-area are counted.

The number of pixels of the image data representing a source image, the number of pixels of each block, and the number of blocks of each sub-area, the number of sub-areas should by no means be limited to the illustrated example. Especially, an individual sub-area has only to include at least one block. Alternative manners of defining sub-areas as targets for counting the number of valid coefficients will be described later with reference to FIGS. 4 through 7.

Two-dimensional DCT converter 1 receives image data (tone values) divided into the multiple blocks, each of which has 8·8 pixels, performs an orthogonal transformation on image data divided in each block to convert the tone values into 8·8 DCT coefficients (transform coefficients) distributed over spatial frequencies. DCT coefficient retaining section 2 temporarily retains the 8·8 DCT coefficients of each block obtained in two-dimensional DCT converter 1.

Linear quantizing section (quantizing means) 3 receives 8·8 DCT coefficients of each block from DCT coefficient retaining section 2 and performs linear quantization on the 8·8 DCT coefficients to output the resultant quantized DCT coefficients (quantized coefficients). Linear quantizing section 3 includes divider 3a, which divides 8·8 DCT coefficients per block by quantization threshold values $q(i)$ (each $q(i)$ is an integer equal to or greater than "0", $i=0, 1, \ldots, 63$), each of which is associated with one of the 8·8 DCT coefficients to thereby obtain 8·8 quantized DCT coefficients.

Two-dimensional DCT converter 1 and linear quantizing section 3 start their operation when counting the number of valid coefficients per sub-area, and start again when actually performing quantization and encoding using quantization threshold values $q(i)$ determined on the basis of the result of the counting of valid coefficients per sub-area in a manner to be described later.

Quantized DCT coefficient retaining section 4 temporarily retains 8·8 quantized DCT coefficients obtained by linear quantizing section 3. Coding table 5 takes the form of one or more Huffman tables.

Variable-length encoding section 6 receives one-dimensional serial data, which is the result of conversion by zig-zag ordering scanning performed on the two-dimensional 8·8 quantized DCT coefficients, from quantized DCT coefficient retaining section 4 and encodes the quantized DCT coefficients using coding table 5 in the same order in which the coefficients are received.

Valid coefficient counter (number counting means) 7A counts number of valid coefficients (non-zero coefficients) among the DCT quantization coefficients of each sub-area, which have been obtained by linear quantizing section 3. FIG. 2 is an example of the result of counting of the valid coefficients by valid coefficient counter 7A. In the example of FIG. 2, the numbers N1, N2, . . . , Nk represent the number of valid coefficients of respective k sub-areas 1 through k, which numbers are counted by valid coefficient counter 7A. Defining of 9 sub-areas as shown in FIG. 3 makes k nine because of the equation k=X·Y=3·3=9.

Data volume adjusting section (adjusting means) 8A determines quantization threshold values $q(i)$ in accordance with a distribution of the numbers N1, N2, . . . , Nk, each of which represents the number of valid coefficients of the corresponding sub-area, and adjusts data volume of the quantized DCT coefficients in such a manner that the quantized DCT coefficients (the entire image data) are to be encoded to the desired data volume F. For this purpose, data volume adjusting section 8A comprises data-volume/valid-coefficient changing section 81, quantization threshold value determining section 82, and total-number/variance computing section 83.

Figure 17:
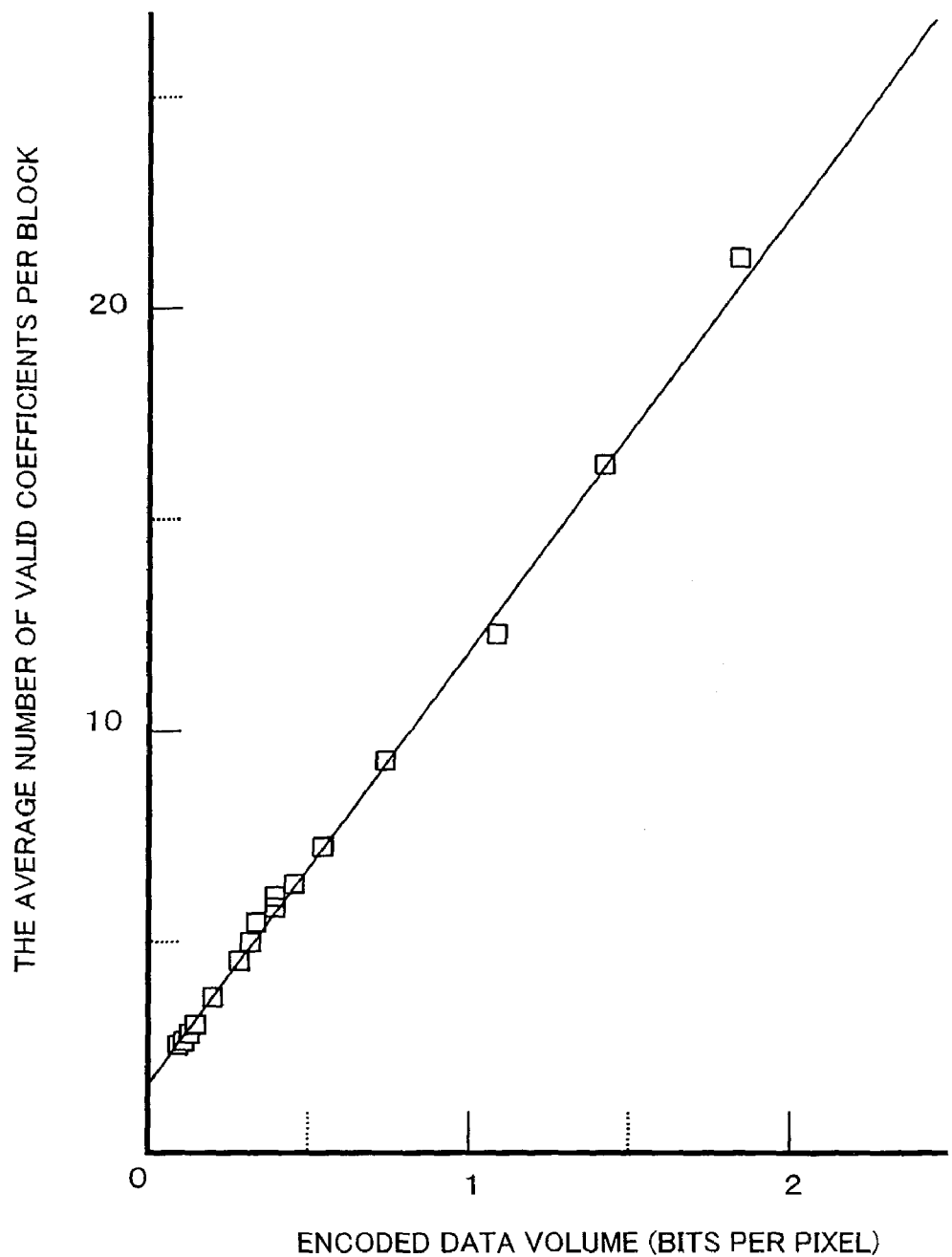
FIG. 17 is a graph showing a relationship between data volume of encoded quantized coefficients and the average number of valid coefficients per block.

Data-volume/valid-coefficient changing section 81 converts the desired data value F into the total number m of valid coefficients to be allocated to the entire image data. As mentioned above with reference to FIG. 17, a data volume of encoded quantization coefficients (bit per pixel) is proportional to the average number of valid coefficients per block consisting of 8·8 pixels. Data-volume/valid-coefficient changing section 81 computes the total number m of valid coefficients to be allocated to the entire image data which number conforms to the desired data volume F based on the proportionate relationship.

On the basis of the numbers N1, N2, . . . , Nk for the individual sub-areas 1 through k, total-number/variance computing section (variance computing means) 83 computes or estimates the total number n of valid coefficients of the entire image data and also computes a variance (a variation in valid coefficients) of the numbers N1 to Nk, each of which represents the number of valid coefficients of the corresponding one of the sub-areas 1 to k. Total-number/variance computing section 83 further reflects features of the source image on quantization threshold value q(i) by adjusting the total number n computed or estimated based on the computed variance. Specifically, if a variance computed exceeds a predetermined value, total-number/variance computing section 83 changes the total number n computed or estimated to a value N, which is greater than the total number n by a certain amount.

When the sub-areas are defined as those of FIG. 3, total-number/variance computing section 83 computes the total number of valid coefficients of the entire image by adding the numbers N1 through Nk. The average number of valid coefficients per block is computed based on the numbers N1 through Nk and further the total number n of valid coefficients can be computed or estimated based on the computed average number.

Quantization threshold value determining section 82 determines quantization threshold values q(i) based on the difference between the total number n obtained by total-number/variance computing section 83 and the total number m obtained by data-volume/valid-coefficient changing section 81. Quantization threshold value determining section 82 comprises quantization threshold value retaining section 82a, scaling controller 82b and multiplier 82c.

Quantization threshold value retaining section 82a retains 8·8 quantization threshold values Q(i) (each Q(i) is an integer equal to or greater than "0", i=0, 1, . . . , 63), which are predefined.

Scaling controller 82b determines, based on the difference between the total number N obtained by total-number/variance computing section 83 and the total number m obtained by data-volume/valid-coefficient changing section 81, a scaling factor SF used for scaling the predefined quantization threshold values Q(i). When the first quantization is performed in order to count the number of valid coefficients, a scaling factor SF is set to "1" so that the predefined quantization threshold values Q(i) retained in quantization threshold value retaining section 82a is used as quantization threshold values q(i).

Multiplier 82c scales the predefined quantization threshold values Q(i) by multiplying a scaling factor SF determined by scaling controller 82b and the predefined quantization threshold values Q(i). The scaled quantization threshold values Q(i) are regarded as actual quantization threshold values q(i) and are input to divider 3a in linear quantizing section 3. Determining of the actual quantization threshold vales q(i) by data volume adjusting section 8A is followed by quantizing and encoding of the entire image data using the determined quantization threshold values q(i).

Figure 18:
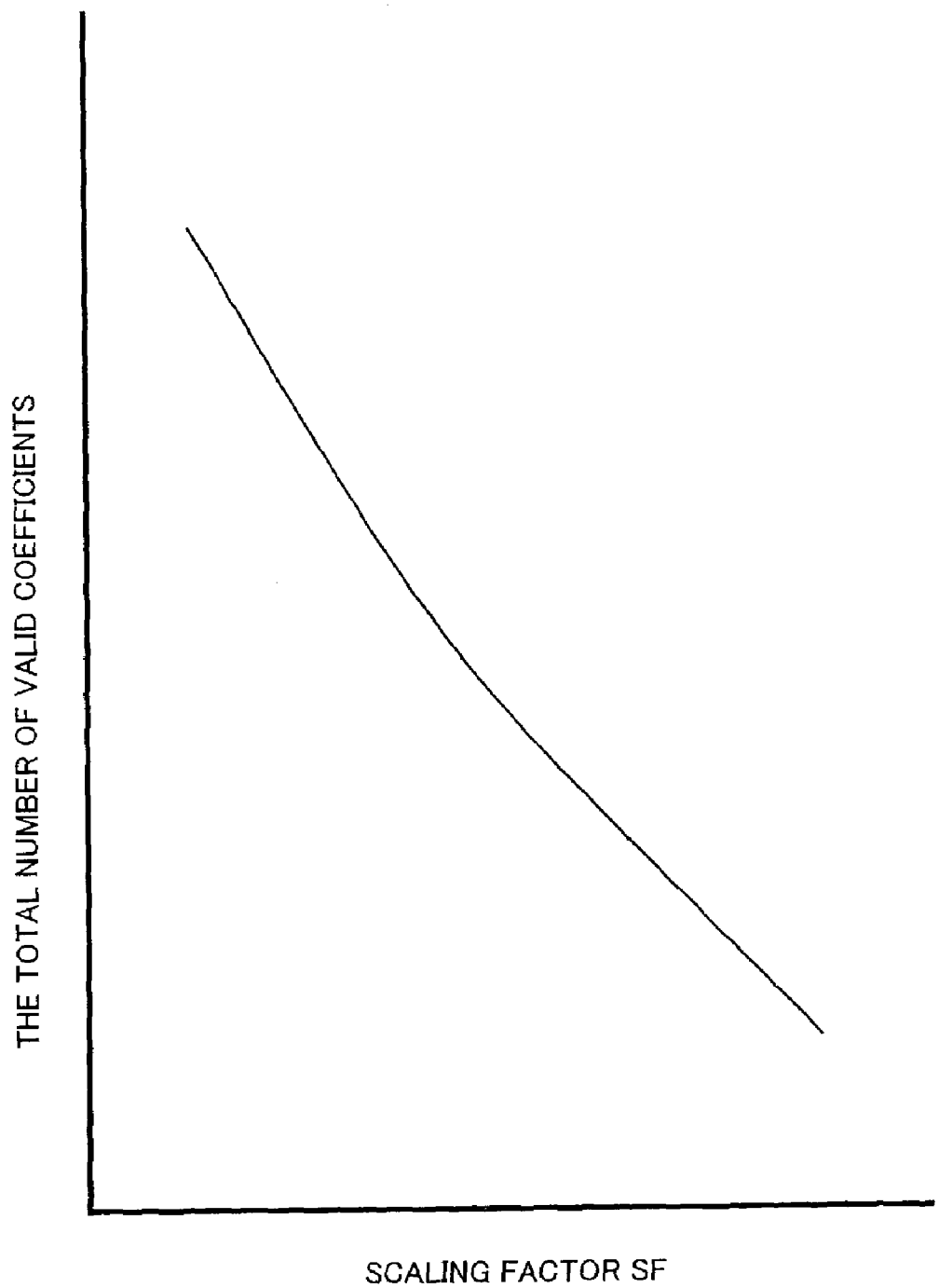
FIG. 18 is a graph showing a relationship between a scaling factor and the total number of valid coefficients.

Quantization threshold values q(i) become greater (in other words, quantization becomes coarser) in accordance with an increase in the scaling factor SF whereupon the total number of valid coefficients is reduced. On the other hand, quantization threshold values q(i) become smaller (i.e., quantization becomes less coarse) in accordance with a decrease in the scaling factor SF whereupon the total number of valid coefficients increases. As described above, the scaling factor SF is inversely proportional to the total number of valid coefficients as shown in FIG. 18. Therefore, if the difference between the total numbers N and m is outside a predefined allowable range and at the same time N is larger than m (i.e., N>m), scaling controller 82b of the first embodiment also sets a scaling factor SF to be large. Conversely, if the difference between N and m is outside the allowable range and N is smaller than m (i.e., N<m), a scaling factor SF is set to be small.

Two-dimensional DCT converter 1, linear quantizing section 3, coding table 5, variable-length encoding section 6, valid coefficient counter 7A, data volume adjusting section 8A and sub-area defining section 9 are realized by dedicated software (an image data encoding program).

The image data encoding program is recorded in a computer-readable recording medium exemplified by a flexible disc and a CD-ROM. In the illustrated embodiment, the image data encoding program is previously recorded in a ROM (Read Only Memory) of a computer that functions as a JPEG encoding circuit, and is read and executed by a non-illustrated CPU (Central Processing Unit) of the computer and thereby functions as two-dimensional DCT converter 1, linear quantizing section 3, coding table 5, variable-length encoding section 6, valid coefficient counter 7A, data volume adjusting section 8A and sub-area defining section 9.

Alternatively, the image data encoding program may be recorded in a storage (a recording medium), such as a magnetic disc, an optical disc, or a magneto-optic disc, and may be provided to a computer via a communication path.

The above-mentioned DCT coefficient retaining section 2 and quantized DCT coefficient retaining section 4 are realized by a non-illustrated RAM (Random Access Memory) or a storage (e.g., a hard disc or an external storage) incorporated in the same computer.

An operation performed in the JPEG encoding circuit of FIG. 1 according to the illustrated embodiment will be described. The JPEG encoding circuit of the first embodiment undertakes the following succession of procedural steps (20) through (33) in order to determine quantization threshold values q(i) that cause a data volume of valid coefficients encoded to be substantially identical to the desired data volume F. After that, the JPEG encoding circuit encodes the quantized DCT coefficients. In this regard, a scaling factor SF is initialized to "1".

Step (20): A desired data volume F is input to data-volume/valid-coefficient changing section 81, and data-volume/valid-coefficient changing section 81 computes the total number m of valid coefficients to be allocated to the entire image data based on the input desired data volume F and the proportionate relationship shown in FIG. 17. Data-volume/valid-coefficient changing section 81 inputs the computed total number m to scaling controller 82b.

Step (21): Prior to the encoding, sub-area defining section 9 defines a plurality of sub-areas each of which has one or more of a multiplicity of blocks of the image data, which is the target of encoding, in accordance with sub-area designation information input by a user or the like. The following steps (22) through (27) are performed on each of the plural sub-areas defined by sub-area defining section 9.

Step (22): Two-dimensional DCT converter 1 receives tone values of 8·8 pixels constituting each block defined as one of the plural sub-area and performs an orthogonal transformation on the tone values using a DCT transformation to thereby obtain 8·8 DCT coefficients, and the DCT coefficients are stored in DCT coefficient retaining section 2.

Step (23): DCT coefficient retaining section 2 sequentially outputs the retained DCT coefficients one by one to divider 3a of linear quantizing section 3 in accordance with data reading signals issued from a non-illustrated timing controller.

Step (24): Concurrently with reading the individual DCT coefficient, multiplier 82c multiplies the predefined quantized threshold value Q(i) which is associated with the DCT coefficient and which is read from quantization threshold value retaining section 82a by the initial scaling factor SF of "1", which is output from scaling controller 82b. The result of the multiplication is regarded as quantization threshold value q(i) associated with the DCT coefficient and is input to divider 3a.

Step (25): Divider 3a divides the DCT coefficient received from DCT coefficient retaining section 2 by the associated quantization threshold value q(i). The resultant quantized DCT coefficient is output to valid coefficient counter 7A.

Step (26): Valid coefficient counter 7A counts up non-zero coefficients (i.e., valid coefficients) among the quantized DCT coefficients received from divider 3a in order to obtain the number of valid coefficients in each sub-area as shown in FIG. 2. The obtained number of valid coefficients of each sub-area is retained in valid coefficient counter 7A.

Step (27): Upon completion of quantization on an individual DCT coefficient, the timing controller instructs DCT coefficient retaining section 2 to read a next DCT coefficient. Steps (24) to (26) are performed on the next DCT coefficient.

Step (28): Steps (23) to (27) are performed on each of all sub-areas so that valid coefficient counter 7A obtains the numbers N1 through Nk, each of which represents the number of valid coefficients of the corresponding sub-area.

Step (29): The numbers N1 through Nk obtained by valid coefficient counter 7A in relation to each of the sub-areas 1 through k are input to total-number/variance computing section 83 in data volume adjusting section 8A.

Step (30): On the basis of N1 through Nk each of which represents the number of valid coefficients among quantized DCT coefficients in one of sub-areas 1 through N, total-number/variance computing section 83 computes or estimates the total number n of valid coefficients of the entire image data and computes a variance of N1 to Nk of sub-areas 1 to k (i.e., a variance of the number of valid coefficients over sub-areas 1 to k, variation in the number of valid coefficients). If the computed variance is greater than a predetermined value, the total number n is changed to a value N, which is greater than the total number n by a certain amount, and the changed total number N is output to scaling controller 82b.

Step (31): Scaling controller 82b determines, based on a difference between the total number m of valid coefficients associated with the desired data volume F and the changed total number N updated by total-number/variance computing section 83, whether or not the scaling factor SF is to be updated.

Step (32): Scaling controller 82b maintains the scaling factor SF of "1" if the difference between N and m is inside the predefined allowable range. While, if the difference is outside the allowable range and N is greater than m (i.e., N>m), scaling controller 82b increases the scaling factor by a certain amount; and if the difference is outside the allowable range and N is smaller than m (i.e., N<m), scaling controller 82b decreases the scaling factor SF by a certain amount.

Step (33): The scaling factor SF as the result of step (32) is multiplied by the predefined quantization threshold values Q(i) obtained by quantization threshold value retaining section 82a to scale the predefined quantized threshold values Q(i). Actual quantization threshold values q (i) obtained by the scaling are input to divider 3a of linear quantizing section 3.

Two-dimensional DCT converter 1, linear quantizing section 3, coding table 5 and variable-length encoding section 6 overall perform quantization and encoding on the entire image data representing the source image using the thus obtained quantization threshold values q(i).

In the first embodiment, a data volume of quantized DCT coefficients is adjusted in accordance with a distribution of the number of valid coefficients over the sub-areas (a variance, or a degree of appearance of valid coefficients in each sub-area) so that it is possible to reflect features of the source image on operations of encoding the image data. Thereby the first embodiment realizes high-quality data volume adjusting, accurately maintaining the features of the source image. Especially in the illustrated embodiment, since quantization threshold values q(i) are determined in accordance with a variance of the number of valid coefficients over the plural sub-areas, encoding is performed regarding a variation of valid coefficients over the source image. In other words, features of the source image are reflected on encoding.

Details of encoding performed in the first embodiment will be described. An image that sharply varies in tone includes a large number of valid coefficients while an image that is gradually varied in tone includes a small number of valid coefficients. A sharp-variation image is exemplified by a landscape of buildings or trees because of the presence of a lot of edges; a gradual-variation image, by a portrait including a person (skin) or monochromatic scene because of the absence of edges. An encoded data volume of a sharp-variation image, such as a landscape, is compressed by dropping data of a part of high frequencies (i.e., edge parts), where human eyes cannot perceive, using large quantization threshold value (i). On the other hand, an encoded data volume of a gradual-variation image, such as a portrait, is increased by setting quantization threshold values q(i) to be small so that the gradual variation in tone is preserved.

In conventional techniques, features of an image are determined in terms of a degree of appearance of valid coefficients over the entire image. A landscape image whose center portion gradually varies in tone has been therefore not effectively encoded because the gradual-variation center portion is quantized more coarsely because of features of the remaining portion.

As a solution to such disadvantages of conventional techniques, the present invention counts the number of valid coefficients in each sub-area and obtains a degree of appearance of valid coefficients (i.e., a variance) over all sub-areas so that quantization threshold values q(i) used for encoding are determined based on the obtained degree. Whereupon the present invention can accurately encode an image having portions having respectively different features.

In the first embodiment, image data is divided into a plurality of sub-areas shown in FIG. 3. Alternatively, sub-areas may be defined in the manner of the following three modifications.

Figure 4:
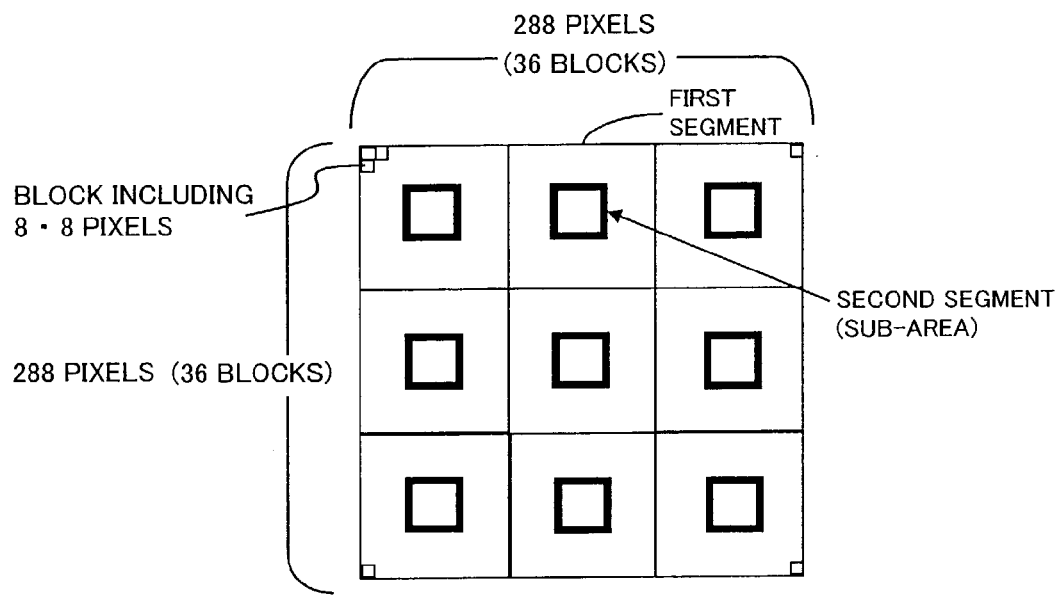
FIG. 4 is a diagram showing target areas for counting the number of valid coefficients according to a first modification.

(A-1) First Modification:

FIG. 4 is a diagram showing sub-areas (targets for counting the number of valid coefficients) defined in a first modification. As shown in FIG. 4, sub-area defining section 9 divides the entire image data into X·Y uniform first segments (X and Y are natural numbers, respectively; in this example, X=Y=3), designates one or more blocks in each of the X·Y first segments as a second segment (a portion enclosed by thick lines in FIG. 4) so that the second segment is smaller than the corresponding first segment, and further designates the designated second segments as the plural sub-areas.

In the illustrated example of FIG. 4, 3·3 uniform first segments as the result of division of the entire image data representing a source image are identical to the sub-areas of the first embodiment, each first segment consisting of 12·12 blocks. Each of the second segments in this example consists of 4·4 blocks disposed at the center portion in the corresponding first segment. Sub-area defining section 9 sequentially selects and extracts the nine second segments shown in FIG. 4 as sub-areas from the image data representing the source image. Each of the extracted sub-areas is subjected to the foregoing processes to count the number of valid coefficients therein. Finally, the first modification obtains the numbers N1 through Nk (here, k=9), each of which represents the number of valid coefficients in the corresponding sub-area, likewise an example of FIG. 2.

When sub-areas (second segments) are defined as shown in FIG. 4, total-number/variance computing section 83 estimates the total number n of valid coefficients over the entire image data in terms of the total sum of N1 through Nk and a ratio of size of all sub-areas (here, the sum of the sizes of the nine second segments) to that of the entire image data. For example, supposing that the total sum of N1 through Nk is represented by NT, the size of the entire image, by S, and the size of all sub-areas, by SS, the following equation gives an estimated total number n of valid coefficients of the entire image data.

$$n = NT \cdot (S/SS) \quad (1)$$

In the example of FIG. 4, equation (1) is n=NT·9.

Defining of sub-areas as shown in FIG. 4 can greatly reduce the number (a data volume) of blocks that are objects of determination of quantization threshold values q(i). This enhances high-speed processing of encoding whereupon the time required to encode image data can be enormously shortened, maintaining features of the source image.

Details of encoding performed in the first modification will be described. If sub-areas are defined as shown in FIG. 3, the above processes (20) to (33) are performed over the entire image data, which is identical in size to image data to be processed by a conventional encoding technique. Generally, one or more parts of the entire image data, which parts are of course smaller in data size than the entire image data, adequately represents features contained in the image data. For that reason, sub-areas are defined by designating second segments of FIG. 4, each of which are inside the corresponding one of the first segments, which are identical to the sub-areas defined in FIG. 3, and counting of valid coefficients is performed on each of the thus-defined sub-areas. As a result, it is possible to grasp the features of the entire image data using a small -volume of data representing one or more parts of the image data.

For example, when the entire full-color (RGB) image data consisting of 640·480 pixels is divided into nine uniform sub-areas (first segments), processes are to be performed on data of 921.6 KB. Conversely, if each of the above first segments is further divided into nine uniform segments, one of which is to be designated as a second segment, and the second segments, each of which is in the corresponding one of the nine first segments, are designated as sub-areas, processes are to be performed on data of 102.4 KB, which is a one-ninth data volume of sub-areas in the form of the first segments. As a result, the time required to perform the processes can be reduced to one-ninth.

Figure 5:
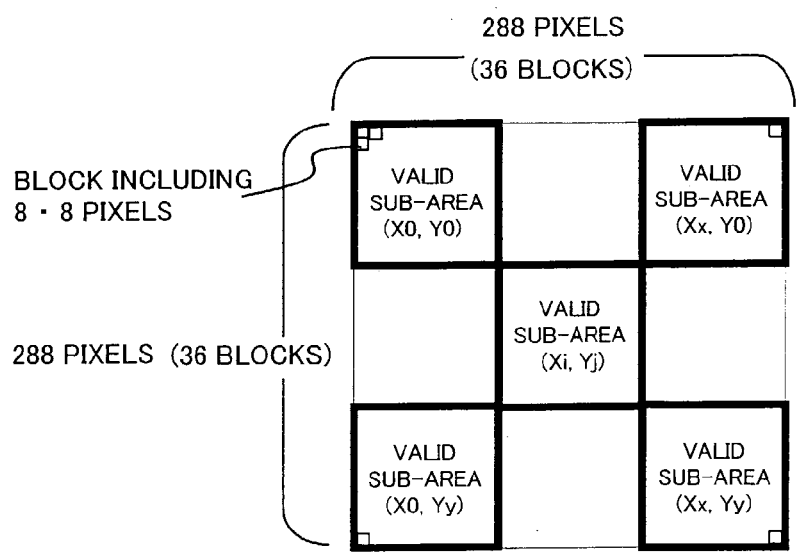
FIG. 5 is a diagram showing target areas for counting the number of valid coefficients according to a second modification.

(A-2) Second Modification:

FIG. 5 is a diagram showing sub-areas (targets for counting the number of valid coefficients) defined in a second modification. As shown in FIG. 5, sub-area defining section 9 divides the entire image data into X·Y uniform segments (X and Y are natural numbers, respectively; in this example X=Y=3), and designates two or more of the uniform segments as the plural sub-areas.

In the illustrated example of FIG. 5, five of 3·3 uniform segments are designated as valid sub-areas (each enclosed by thick lines) having two-dimensional addresses of (X0, Y0), (Xx, Y0), (Xi, Yj), (X0 Yy) and (Xx, Yy). Sub-area defining section 9 sequentially selects and extracts the five valid sub-areas of FIG. 5 from the image data representing the source image. After that, each of the five valid sub-areas is subjected to the foregoing processes (20) to (33) to count the number of valid coefficients therein. Finally the second modification obtains the numbers of N1 through Nk (here, k=5), each of which represents the number of valid coefficients in the corresponding valid sub-area, likewise an example of FIG. 2.

When sub-areas are defined as shown in FIG. 5, total-number/variance computing section 83 estimates the total number n of valid coefficients of the entire image data using equation (1) in terms of the total sum NT of N1 through Nk and a ratio SS/S of size of all sub-areas (in this case, the total size of the five valid sub-areas) to that of the entire image data. In the example of FIG. 5, equation (1) becomes n=NT (9/5).

Since the center and the four corners, which constitute features of the image data, are designated as the valid sub-areas, as shown in FIG. 5, it is possible for the second modification, similar to the first modification, to greatly reduce the number (a data volume) of blocks that are subjected to determination of quantization threshold values q(i). This enhances high-speed processing of encoding whereupon the time required to encode image data can be enormously shortened, maintaining features of the source image. In addition to the above advantages, the reduction in the number of sub-areas of process targets can reduce the capacity of a memory required to retain the result of counting of valid coefficients and thereby contribute to saving memory.

Details of encoding performed in the second modification will be described. Generally, features of an image tend to appear at the center and the four corners of the image. For that reason, the second modification defines two or more predetermined segments as sub-areas so that a data volume of process targets and a capacity of a memory required to retain the result N1 to Nk (here, k=5) of counting the number of valid coefficients of each sub-area can be reduced.

For example, when the entire full-color (RGB) image data consisting of 640·480 pixels is divided into nine uniform sub-areas, processes are to be performed on data of 921.6 KB. On the other hand, if sub-areas are defined as five segments of the center and the four corners as shown in FIG. 5, a volume of data to be processed is reduced to 512 KB that is five ninths of that of the example shown in FIG. 3 whereupon the time required for processes are also reduced to five-ninths. Accordingly, a capacity required to retain the result N1 to Nk (k=5) of counting the number of valid coefficients in each sub-area is reduced to five ninths so that memory can be saved.

(A-3) Third Modification:

FIGS. 6A, 6B, 7A and 7B are diagrams showing sub-areas as targets for counting the number of valid coefficients according to a third modification.

In the illustrated modification, sub-area defining section 9 defines two or more segments (enclosed by thick lines in the accompanying drawings) each of which includes one or more of the multiple blocks as a plurality of sub-areas on the basis of the type of the source image.

Features of a portrait image are very different from that of a landscape image. If it is possible to identify the type of an image to be encoded (for example, by a user explicitly designating a type of an object to be photographed when setting a photographing mode of a camera), sub-areas are defined in accordance with a type of an image so as to represent features of the image more exactly than the remaining part.

Figure 6A:
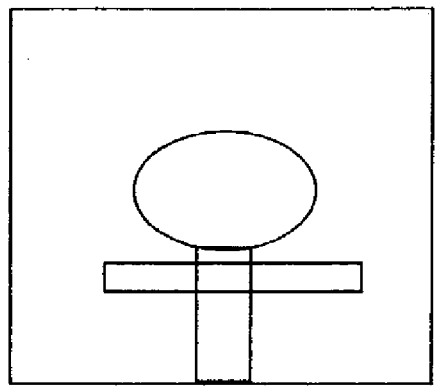
FIGS. 6A, 6B, 7A and 7B are diagrams showing target areas for counting the number of valid coefficients according to a third modification.
Figure 6B:
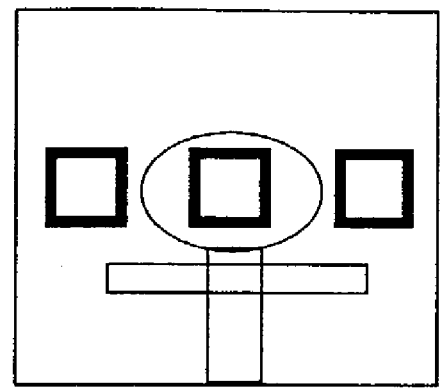
Figure 7A:
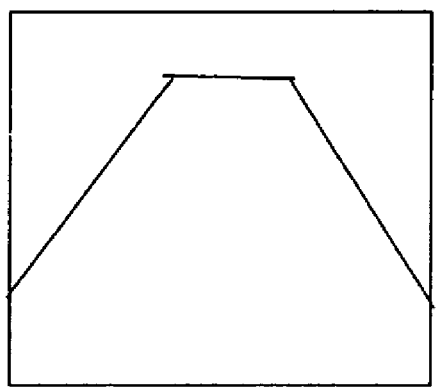
Figure 7B:
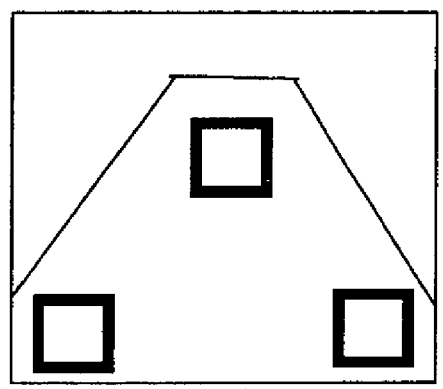

For example, sub-area defining section 9 defines three sub-areas shown in FIG. 6B for a portrait image of FIG. 6A while three sub-areas shown in FIG. 7B are defined in relation to a landscape image of FIG. 7A. Namely, the third modification defines sub-areas different in position in accordance with a type of a source image.

Sub-area defining section 9 sequentially selects and extracts the three valid sub-areas of FIG. 6B or 7B from the image data representing the source image. After that, each of the three sub-areas is subjected to the foregoing processes to count the number of valid coefficients therein. Finally the third modification obtains the numbers of N1 through Nk (here, k=3), each of which represents the number of valid coefficients in the corresponding sub-area, likewise an example of FIG. 2.

Also when sub-areas are defined as shown in FIG. 6B or 7B, total-number/variance computing section 83 estimates the total number n of valid coefficients of the entire image data using equation (1) in terms of the total sum NT of N1 through Nk and a ratio SS/S of size of all sub-areas (in this case, the total size of the three sub-areas) to that of the entire image data.

It is possible for the third modification to greatly reduce the number (a data volume) of blocks that are subjected to determination of quantization threshold values q(i) by designating two or more segments in image data as sub-areas as shown in FIGS. 6B and 7B in accordance with a type of a source image (e.g., a landscape image, a portrait image). This enhances high-speed processing of encoding whereupon the time required to encode image data can be enormously shortened, grasping features of the source image, which features are corresponding to a type of the source image, at the same time. Further, the reduction in the number of sub-areas of process targets can reduce the capacity of a memory required to retain the result of counting valid coefficients and thereby contributing to saving memory.

Details of encoding performed in the third modification will be described. In order to accommodate the third modification, an image capturing device (such as a digital camera), to which a user can previously set a type of an object to be taken, is set to automatically select an arrangement of a plurality of sub-areas in accordance with the candidate type (a portrait, a landscape, or the like) of the image. Generally, it is possible to specify representative portions of an image in accordance with the type of the image. For example, a portrait image is typified by the center portion, and a landscape image, by the overall portion. Hence, previously determining arrangements of sub-areas corresponding to types of an image to be taken can typify an image that is a target for encoding with ease. In addition to grasping features of an image to be encoded with ease, the predetermined arrangements can reduce a data volume to be used for encoding processes and capacity of a memory required to retain results N1 through Nk (k=3) of counting of the number of valid coefficients.

For example, when the entire full-color (RGB) image data consisting of 640·480 pixels is divided into nine uniform sub-areas, processes are to be performed on data of 921.6 KB. On the other hand, if three sub-areas are defined based on an image of each type, as shown in FIGS. 6B and 7B, processes (20) to (33) are performed on data of a volume of 307.2 KB, which is one-third the data volume of that of FIG. 3, so the time required to perform the processes also shortens to one-third of that required in FIG. 3. Further, a capacity required to retain the result N1 to Nk (k=3) of counting the number of valid coefficients is reduced to one third so that memory can also be saved.

Figure 8:
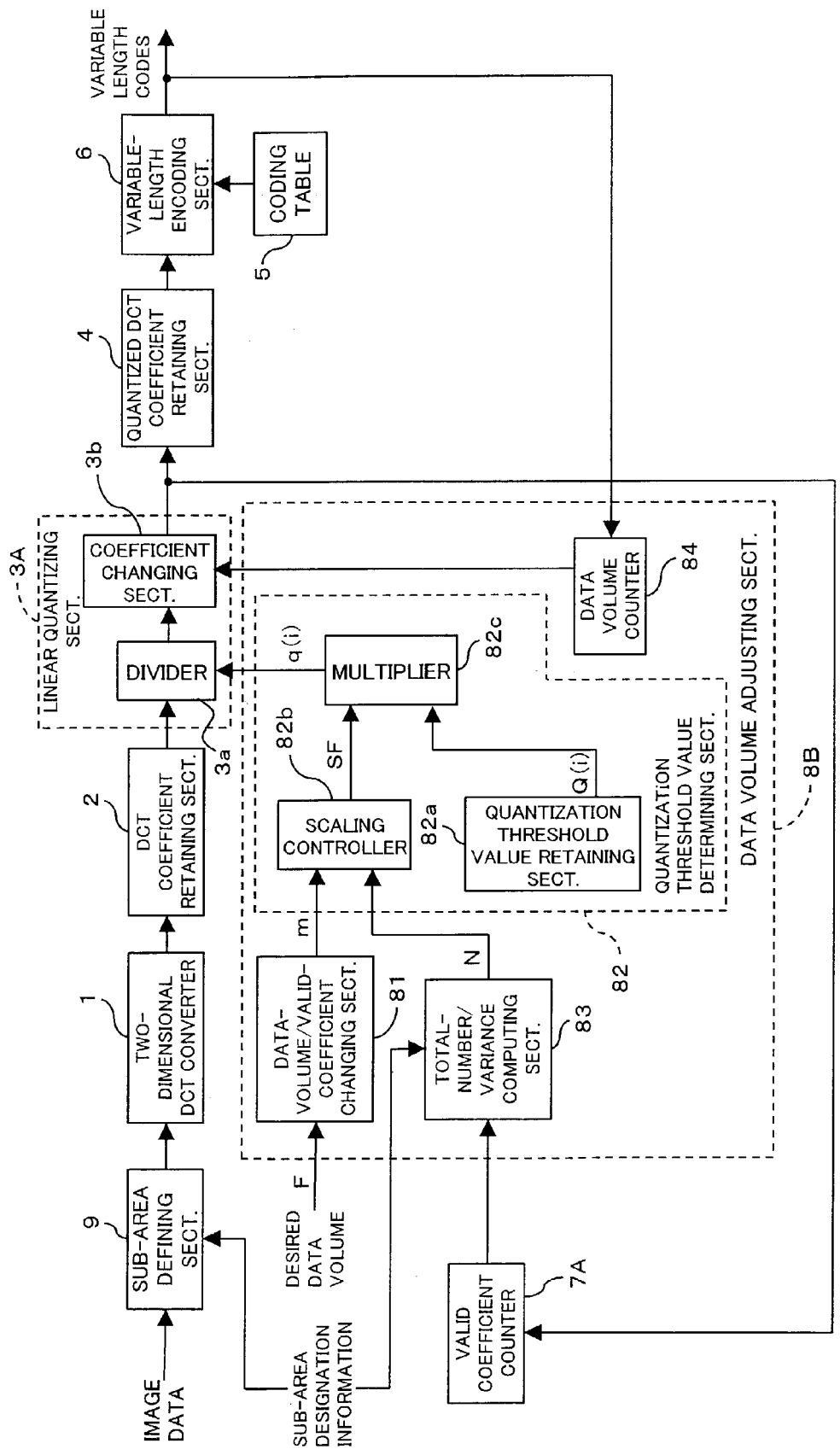
FIG. 8 is a block diagram schematically showing a JPEG encoding circuit to which a method for encoding image data according to a second embodiment of the present invention is applied.

(B) Second Embodiment:

FIG. 8 is a block diagram schematically showing a JPEG encoding circuit to which a method for encoding image data according to a second embodiment of the present invention is applied. The JPEG encoding circuit of FIG. 8 seems to be almost similar in construction to that of FIG. 1, but linear quantizing section 3A and data volume adjusting section 8B of FIG. 8 substitute for linear quantizing section 3 and data volume adjusting section 8B of FIG. 1, respectively. Reference numbers of FIG. 8 identical to those already referred to indicate elements identical or substantially identical to the referred elements, so any repetitious description is omitted here.

Linear quantizing section (quantization means) 3A includes coefficient changing section 3b in addition to divider 3a. Data volume adjusting section (adjusting means) 8B includes data volume counter 84 in addition to already-described data-volume/valid-coefficient changing section 81, quantization threshold value determining section 82, and total-number/variance computing section 83.

Data volume counter (volume counting means) 84 counts a data volume of quantized DCT coefficients of each sub-area encoded by variable-length encoding section 6 while variable-length encoding section 6 is encoding the quantized DCT coefficients.

Coefficient changing section 3b changes one or more valid coefficients to invalid coefficients if it is judged, based on the data volumes counted by data volume counter 84, the quantized DCT coefficients representing the entire image data are likely to be encoded to a data volume exceeding a desired data volume F.

Identical to the first embodiment, linear quantizing section 3A and data volume adjusting section 8B are realized by a computer executing dedicated software (an image data encoding program).

An operation performed in the JPEG encoding circuit of FIG. 8 according to the illustrated embodiment will be described. In the second embodiment, quantization threshold values q(i) are determined, linear quantizing section 3A (divider 3a) quantizes the DCT coefficients of the entire image data representing a source image using the determined quantization threshold values q(i) to thereby obtain quantized DCT coefficients, and coding table 5 and variable-length encoding section 6 encode the quantized DCT coefficients in substantially the same manner as those performed in the first embodiment.

Figure 9A:
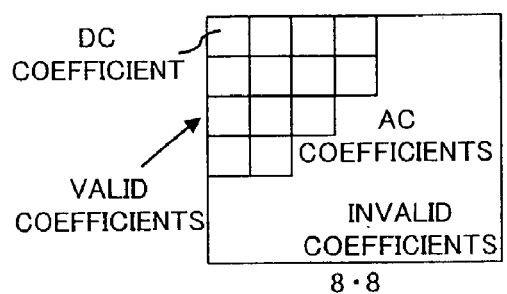
FIGS. 9A and 9B are diagrams showing a characteristic operation (changing valid coefficients to invalid coefficients) performed in the encoding method according to the second embodiment.
Figure 9B:
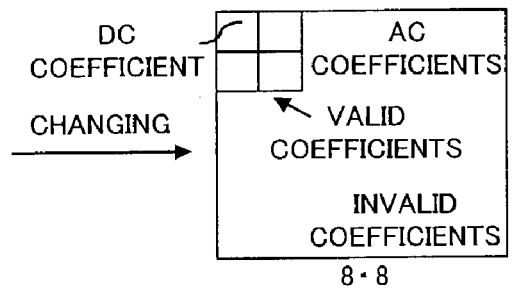
Figure 10:
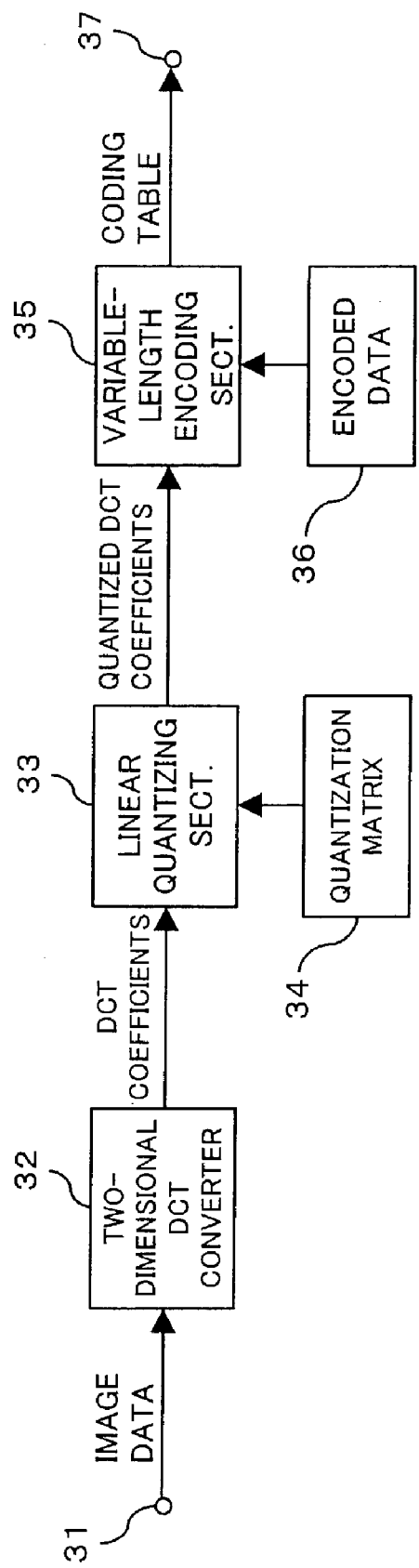
FIG. 10 is a block diagram schematically showing a conventional JPEG encoding circuit.
Figure 16:
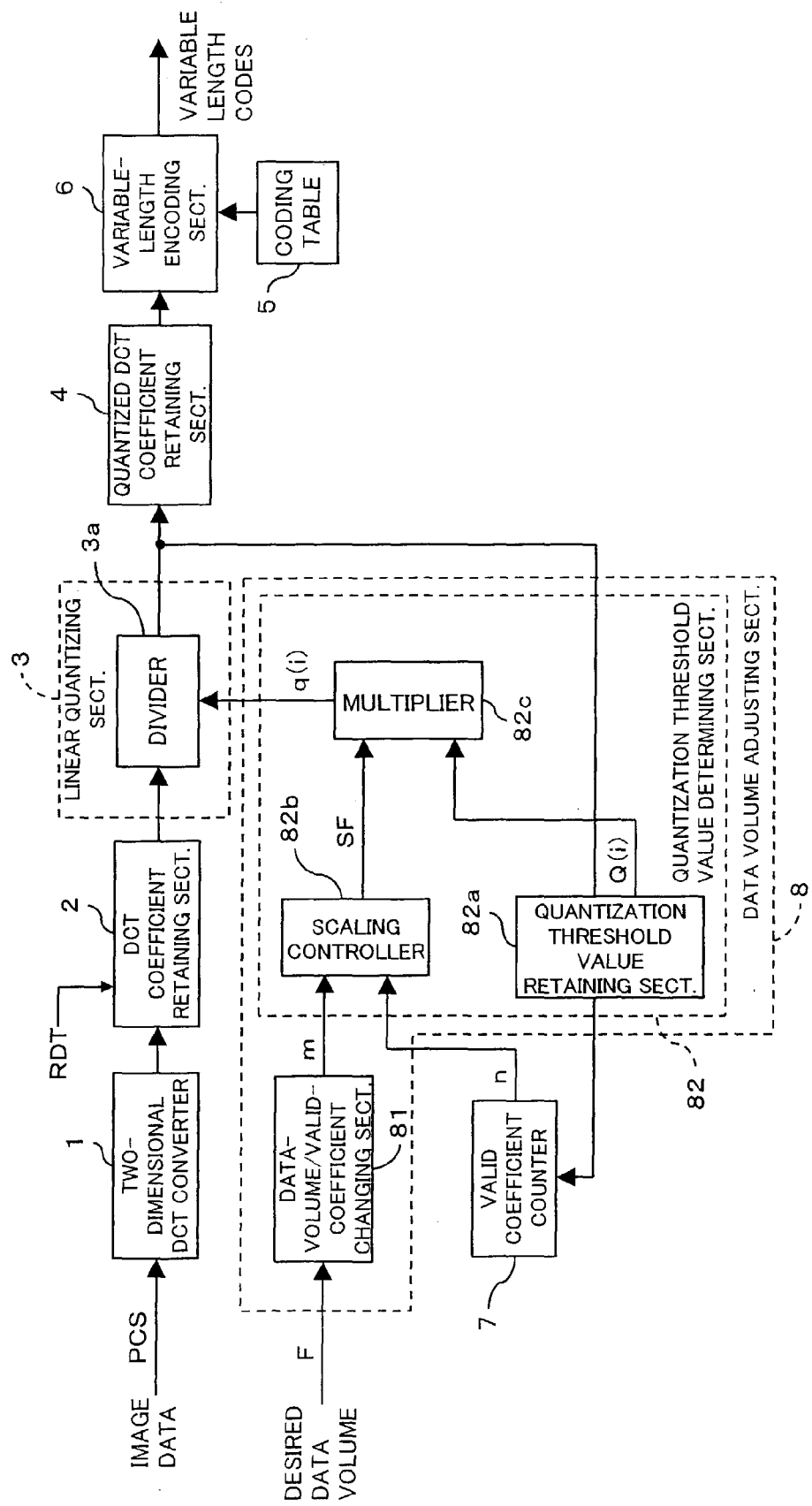
FIG. 16 is a block diagram schematically showing another conventional JPEG encoding circuit.

At that time, data volume counter 84 counts a data volume of quantized DCT coefficients encoded by variable-length encoding section 6. For example, if a data volume of quantized DCT coefficients representing the half of the entire image data, the coefficients of which are encoded by variable-length encoding section 6, exceeds the half of the desired data volume F the quantized DCT coefficients representing the entire image data are likely to be encoded to a data volume exceeding the desired data volume F. To avoid such exceeding, coefficient changing section 3b changes one or more valid coefficients (nine coefficients in the drawing) among the quantized DCT coefficients of blocks representing a peripheral portion of the source image shown in FIG. 9A to invalid coefficients as shown in FIG. 9B.

As a result, in the second embodiment, even if it is estimated that the quantized DCT coefficients representing the entire image data is likely to be encoded to a data volume exceeding the desired data volume F, it is possible to encode the entire quantized DCT coefficients within the desired data volume F by changing one or more valid coefficients in the quantized DCT coefficients to invalid coefficients. The encoding of the illustrated embodiment degrades the quality of a peripheral portion of the source image, which portion is less focused on, to some extent, but enhances the quality of the center portion which is largely focused on. At the same time, the resultant data volume of encoding of entire quantized DCT coefficients can be reduced to the desired data volume F and extremely high-quality encoding of image data can be realized.

Specifically, the second embodiment performs the steps (20) to (33) once to determine quantization threshold values q(i) and then immediately quantizes and encodes DCT coefficients. If a final volume of all encoded quantized DCT coefficients (the entire image data) is likely to exceed the desired data volume F, data volume counter 84 and coefficient changing section 3b adjusts the final volume to the desired data volume F. Repetitious performing of steps (3) to (11), which are required for a conventional method, can be dispensed with in order to determine quantization threshold values q(i) in the second embodiment so that high-quality encoding can be performed for a very short time.

Details of the second embodiment will now be described. A volume of data generated by encoding should be restricted such that the final volume of the encoded entire image data (the all quantized DCT coefficient as the result of completion of encoding) perfectly fits the desired data volume F. However, such restriction results in degrading the quality of the encoded entire image. As a solution, a volume of data generated is less restricted (in other words, the quality of image data is improved compared with the above manner) by changing, if the quantized DCT coefficients representing the entire image data is likely to be encoded to the prospective final data volume exceeding the desired data volume F, valid coefficients representing the peripheral portion of an image where users tend to focus less on are changed to invalid coefficients resulting in lowering the quality of the peripheral portion to some extent. However less restriction causes the prospective final data volume to be the desired data volume F and at the same time enhances the quality of the center portion of the same image, which portion a user largely focuses on.

(C) Others:

Further, the present invention should by no means be limited to these foregoing embodiments and modifications, and various changes or modifications maybe suggested without departing from the gist of the invention.

What is claimed is:

1. A method for encoding image data representing a source image, the image data having a multiplicity of blocks each of which includes a number of pixels, said method comprising the steps of:
    (a) defining a plurality of sub-areas so that each of the plural sub-area has one or more of the multiple blocks;
    (b) performing an orthogonal transformation on tone values of the pixels in each of the multiple blocks to thereby obtain transform coefficients;
    (c) quantizing the transform coefficients of each said block to thereby obtain quantization coefficients;
    (d) counting the number of valid coefficients among the quantization coefficients in each of the plural sub-areas;
    (e) adjusting the quantization coefficients of the multiple blocks in accordance with a distribution of the numbers of valid coefficients over the plural sub-areas (that is, in accordance with a degree of appearance of the valid coefficients of each said sub-area), the numbers being counted in said step (d) of counting, in such a manner that the quantization coefficients are to be encoded to a desired data volume; and
    (f) encoding the adjusted quantization coefficients.

2. A method for encoding image data according to claim 1, wherein said step (a) of defining comprises:
    dividing the multiple blocks into uniform X·Y segments, where X and Y are natural numbers; and
    designating the entire part of each of the X·Y segments as one of the plural sub-areas.

3. A method for encoding image data according to claim 1, wherein said step (a) of defining comprises:
    dividing the multiple blocks into X·Y uniform first segments, where X and Y are natural numbers;
    designating one or more blocks in each of said X·Y first segments as a second segment so that the second segment is smaller than each said first segment; and
    designating the second segment in each said first segment as one of the plural sub-areas.

4. A method for encoding image data according to claim 1, wherein said step (a) of defining comprises:
    dividing the multiple blocks into X·Y uniform segments, where X and Y are natural numbers; and
    designating two or more from the X·Y segments as the plural sub-areas.

5. A method for encoding image data according to claim 1, wherein said step (a) of defining is performed by designating two or more segments each of which includes one or more of the multiple blocks as the plural sub-areas on the basis of the type of the source image.

6. A method for encoding image data according to claim 1, further comprising the steps of:
    (g) counting a data volume of the quantization coefficients of each said block during said step (f) of encoding; and
    if it is discriminated, on the basis of the data volumes counted in said step (g) of counting, that the quantization coefficients representing the entire image data is likely to be encoded to a data volume exceeding the desired data volume,
    (h) changing one or more of the valid coefficients of the multiple blocks to invalid coefficients.

7. A method for encoding image data according to claim 1, further comprising the step of computing a variance of the number of valid coefficients over the plural sub-areas on the basis of the counted number of valid coefficients in each said sub-areas,
    said step (e) of adjusting being performed in accordance with the variance computed.

8. A method for encoding image data according to claim 6, further comprising the step of computing a variance of the number of valid coefficients over the plural sub-areas on the basis of the counted number of valid coefficients in each said sub-areas,
    said step (e) of adjusting being performed in accordance with the computed variance.

9. An apparatus for encoding image data representing a source image, the image data having a multiplicity of blocks each of which includes a number of pixels whose tone values are to be transformed into transform coefficients by an orthogonal transformation, said apparatus comprising:

sub-area defining means for defining a plurality of sub-areas so that each of the plural sub-areas has one or more of the multiple blocks;

quantization means for quantizing the transform coefficients of each of the multiple blocks to obtain quantization coefficients;

number counting means for counting the number of valid coefficients among the quantization coefficients of each of the plural sub-areas;

adjusting means for adjusting the quantization coefficients of the multiple blocks in accordance with a distribution of the numbers of valid coefficients over the plural sub-areas (that is, in accordance with a degree of appearance of the valid coefficients of each said sub-area), the numbers being counted by said number counting means, in such a manner that the quantization coefficients are to be encoded to a desired data volume; and encoding means for encoding the adjusted quantization coefficients.

10. An apparatus for encoding image data according to claim 9, wherein said sub-area defining means divides the multiple blocks into X·Y uniform segments, where X and Y are natural numbers, and designates the entire part of each of said X·Y segments as one of the plural sub-areas.

11. An apparatus for encoding image data according to claim 9, wherein said sub-area defining means divides the multiple blocks into X·Y uniform first segments, where X and Y are natural numbers, designates one or more blocks in each of said X·Y first segments as a second segment so that the second segment is smaller than each said first segment, and designates the second segment in each said first segment as one of the plural sub-areas.

12. An apparatus for encoding image data according to claim 9, wherein said sub-area defining means divides the multiple blocks into X·Y uniform segments, where X and Y are natural numbers, and designates two or more from said X·Y segments as the plural sub-areas.

13. An apparatus for encoding image data according to claim 9, wherein said sub-area defining means designates two or more segments each of which includes one or more of the multiple blocks as the plural sub-areas on the basis of the type of the source image.

14. An apparatus for encoding image data according to claim 9, further comprising:

volume counting means for counting a data volume of the quantization coefficients of each said blocks while the adjusted quantization coefficients are encoded; and changing means for changing, if it is discriminated based on the data volumes counted by said volume counting means that the quantization coefficients representing the entire image data is likely to be encoded to a data volume exceeding the desired data volume, changing one or more of the valid coefficients of the multiple blocks to invalid coefficients.

15. An apparatus for encoding image data according to claim 9, further comprising variance computing means for computing a variance of the number of valid coefficients over the plural sub-areas on the basis of the number of valid coefficients in each said sub-areas, the number is counted by said number counting means, said adjusting means adjusting the quantization coefficients of each said block in accordance with the computed variance.

16. An apparatus for encoding image data according to claim 14, further comprising variance computing means for computing a variance of the number of valid coefficients over the plural sub-areas on the basis of the number of valid coefficients in each said sub-areas, the number is counted by said number counting means, said adjusting means adjusting the quantization coefficients of each said block in accordance with the computed variance.

17. A computer-readable recording medium in which a program for encoding image data representing a source image, the image data having a multiplicity of blocks, each of which includes a number of pixels whose tone values are to be transformed into transform coefficients by an orthogonal transformation, said program instructing a computer to function as:

sub-area defining means for defining a plurality of sub-areas so that each of the plural sub-areas has one or more of the multiple blocks;

quantization means for quantizing the transform coefficients of each of the multiple blocks to obtain quantization coefficients;

number counting means for counting the number of valid coefficients among the quantization coefficients of each of the plural sub-areas;

adjusting means for adjusting the quantization coefficients of the multiple blocks in accordance with a distribution of the numbers of valid coefficients over the plural sub-areas (that is, in accordance with a degree of appearance of the valid coefficients of each said sub-area), the numbers being counted by said number counting means, in such a manner that the quantization coefficients are to be encoded to a desired data volume; and encoding means for encoding the adjusted quantization coefficients.

18. A computer readable recording medium according to claim 17, wherein said sub-area grouping means divides the multiple blocks into X·Y uniform segments, where X and Y are natural numbers, and designates the entire part of each of said X·Y segments as one of the plural sub-areas.

19. A computer readable recording medium according to claim 17, wherein said sub-area grouping means divides the multiple blocks into X·Y uniform first segments, where X and Y are natural numbers, designates one or more blocks in each of said X·Y first segments as a second segment so that the second segment is smaller than each said first segment, and designates the second segment in each said first segment as one of the plural sub-areas.

20. A computer readable recording medium according to claim 17, wherein said sub-area grouping means divides the multiple blocks into X·Y uniform segments, where X and Y are natural numbers, and designates two or more from said X·Y segments as the plural sub-areas.

21. A computer readable recording medium according to claim 17, wherein said sub-area defining means designates two or more segments each of which includes two or more of the multiple blocks as the plural sub-areas on the basis of the type of the source image.

22. A computer readable recording medium according to claim 17, said program instructing the computer to further function as:

volume counting means for counting a data volume of the quantization coefficients of each said blocks while the adjusted quantization coefficients are encoded; and changing means for changing, if it is discriminated based on the data volumes counted by said volume counting means that the quantization coefficients representing the entire image data is likely to be encoded to a data volume exceeding the desired data volume, changing one or more of the valid coefficients of the multiple blocks to invalid coefficients.

23. A computer readable recording medium according to claim 17, said program instructing the computer to further function as variance computing means for computing a variance of the number of valid coefficients over the plural sub-areas on the basis of the number of valid coefficients in each said sub-areas, the number is counted by said number counting means, said adjusting means adjusting the quantization coefficients of each said block in accordance with the computed variance.

24. A computer readable recording medium according to claim 22, said program instructing the computer to further function as variance computing means for computing a variance of the number of valid coefficients over the plural sub-areas on the basis of the number of valid coefficients in each said sub-areas, the number is counted by said number counting means, said adjusting means adjusting the quantization coefficients of each said block in accordance with the computed variance.

* * * * *